United States Patent [19]
Palansky et al.

[11] Patent Number: 5,475,590
[45] Date of Patent: Dec. 12, 1995

[54] AUTOMATIC TRANSMISSION TORQUE CONVERTER BYPASS CLUTCH CONTROL USING ENGINE TORQUE COMPENSATION

[75] Inventors: Bruce J. Palansky, Livonia; Thomas L. Greene, Plymouth; Eileen A. Schock, Dexter, all of Mich.

[73] Assignee: Ford Motor Company, Dearborn, Mich.

[21] Appl. No.: 139,690

[22] Filed: Oct. 22, 1993

[51] Int. Cl.⁶ .............. G06F 19/00; F16H 59/48; F16H 61/58

[52] U.S. Cl. .............. 364/424.1; 477/65; 477/120; 477/905; 477/155; 475/123; 475/128; 475/249; 192/3.31; 192/113.36; 192/3.3

[58] Field of Search .............. 364/424.1, 424.01, 364/431.05; 477/65, 63, 30, 62, 86, 97, 120, 121, 168, 180, 155, 169, 60, 142, 143, 150, 905, 124, 154, 126, 137; 192/3.31, 113.36, 3.3; 475/123, 128

[56] References Cited

U.S. PATENT DOCUMENTS

| | | | |
|---|---|---|---|
| 4,228,700 | 10/1980 | Espenschied et al. | 477/154 |
| 4,393,467 | 7/1983 | Miki et al. | 364/424.1 |
| 4,474,081 | 10/1984 | Kinugasa et al. | 364/424.1 |
| 4,662,247 | 5/1987 | Sotoyama et al. | 477/6.1 |
| 4,665,770 | 5/1987 | Van Selous | 477/60 |
| 4,688,450 | 8/1987 | Hayashi et al. | 364/424.1 |
| 4,737,915 | 4/1988 | Hosaka | 364/424.1 |
| 4,742,733 | 5/1988 | Schreiner | 477/120 |
| 4,777,848 | 10/1988 | Taga et al. | 477/129 |
| 4,807,497 | 2/1989 | Yasue et al. | 477/98 |
| 4,868,753 | 9/1989 | Mori | 364/424.1 |
| 4,943,921 | 7/1990 | Baltusis et al. | 364/424.1 |
| 4,953,091 | 8/1990 | Baltusis et al. | 364/424.1 |
| 5,029,087 | 7/1991 | Cowan et al. | 364/424.1 |
| 5,035,160 | 7/1991 | Morita | 364/424.1 |
| 5,062,321 | 11/1991 | Koenig et al. | 477/155 |
| 5,069,083 | 12/1991 | Hirano et al. | 477/39 |
| 5,069,084 | 12/1991 | Matsuno et al. | 477/61 |
| 5,086,665 | 2/1992 | Milunas et al. | 477/155 |
| 5,107,724 | 4/1992 | Takizawa | 477/97 |
| 5,138,905 | 8/1992 | Kouno | 477/80 |
| 5,150,297 | 9/1992 | Daubenmier et al. | 364/424.1 |
| 5,157,609 | 10/1992 | Stehle et al. | 364/424.1 |
| 5,166,849 | 11/1992 | Greene et al. | 364/424.1 |
| 5,172,609 | 12/1992 | Nitz et al. | 364/424.1 |
| 5,182,710 | 1/1993 | Tomisawa | 364/424.1 |
| 5,303,616 | 4/1994 | Palansky et al. | 477/65 |
| 5,315,901 | 5/1994 | Barnes | 477/62 |
| 5,335,568 | 8/1994 | Kammerl et al. | 477/109 |
| 5,341,703 | 8/1994 | Palansky et al. | 477/65 |

Primary Examiner—Kevin J. Teska
Assistant Examiner—Jacques H. Louis-Jacques
Attorney, Agent, or Firm—Frank G. McKenzie; Roger L. May

[57] ABSTRACT

A system and method for controlling the bypass clutch of an automatic transmission includes an electronic microprocessor, an electronic memory accessible to the microprocessor, solenoid-operated bypass valve, pressure actuated bypass clutche, a variable force solenoid-operated bypass valve, a torque converter bypass friction clutch, and control algorithms that produce output signals to control the state of the solenoid-operated valve. The vehicle speed at which the bypass clutch engages and disengages, according to a reference schedule, is compensated for loss of engine torque at conditions that differ from the conditions at which the reference schedule is defined. Vehicle speed is compensated for torque variation with reference to the ratio of current calculated engine torque divided by current engine output torque.

9 Claims, 6 Drawing Sheets

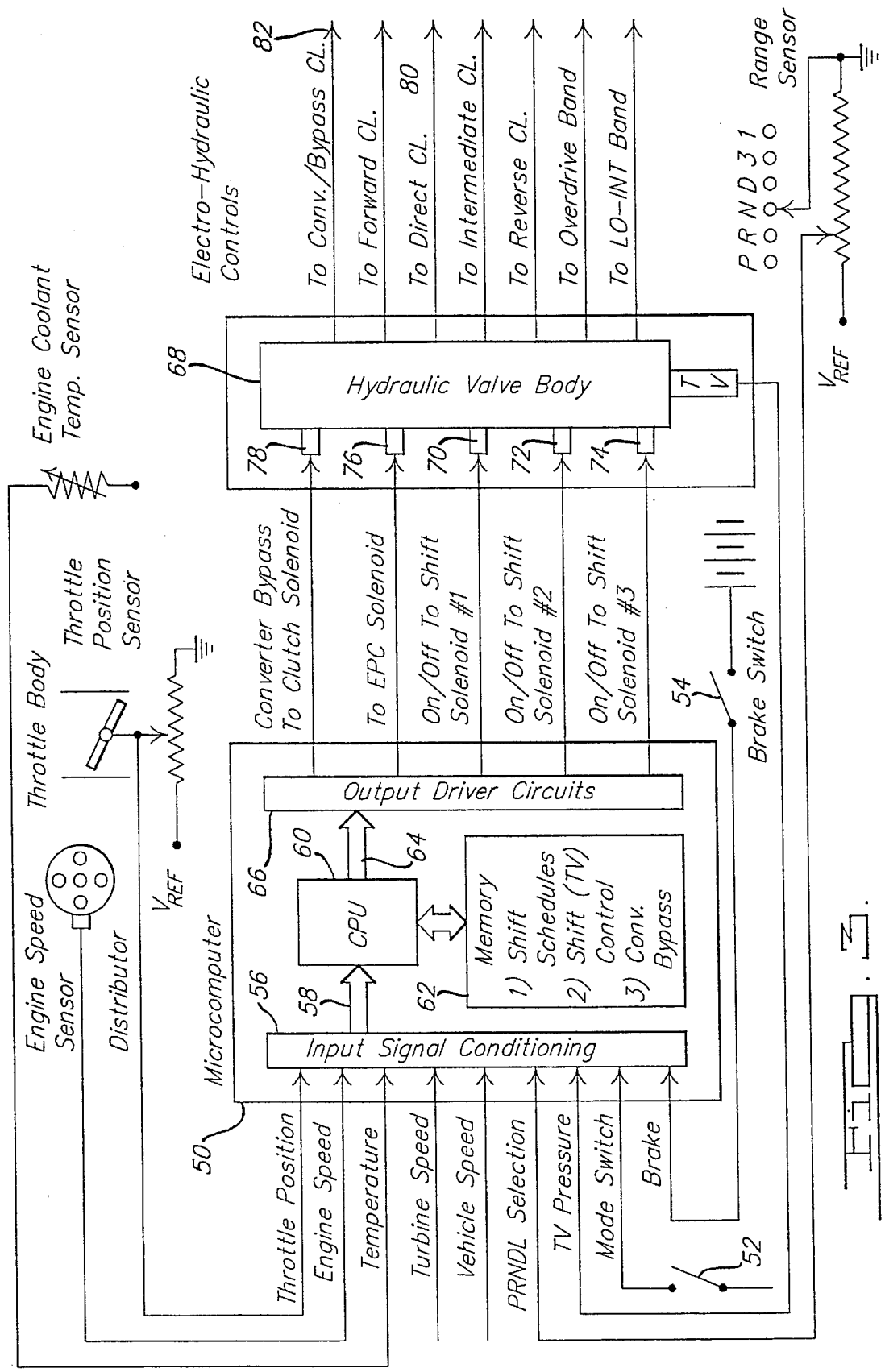

FNXXTQ
| TP_REL | UPSHIFT | | | DOWNSHIFT | | | |
|---|---|---|---|---|---|---|---|
| | 1-2 | 2-3 | 3-4 | 4-3 | 3-2 | 2-1 | |
| 200/700 | -2.0 | -2.0 | -1.5 | -1.5 | -1.5 | -2.0 | mph |
| 400/700 | -4.0 | -2.0 | -3.0 | -3.0 | -1.5 | -2.0 | |
FIG. 9.
NEXXTQ
| TP_REL | UPSHIFT | | | |
|---|---|---|---|---|
| | 1-2 | 2-3 | 3-4 | |
| 700/700 | -300 | -250 | -200 | rpm |
FIG. 10.
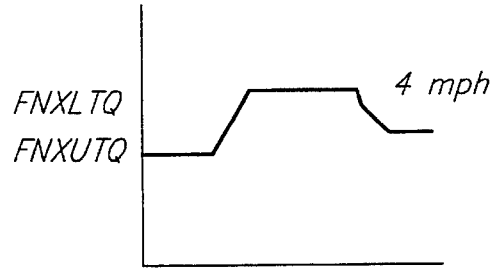
FIG. 12.
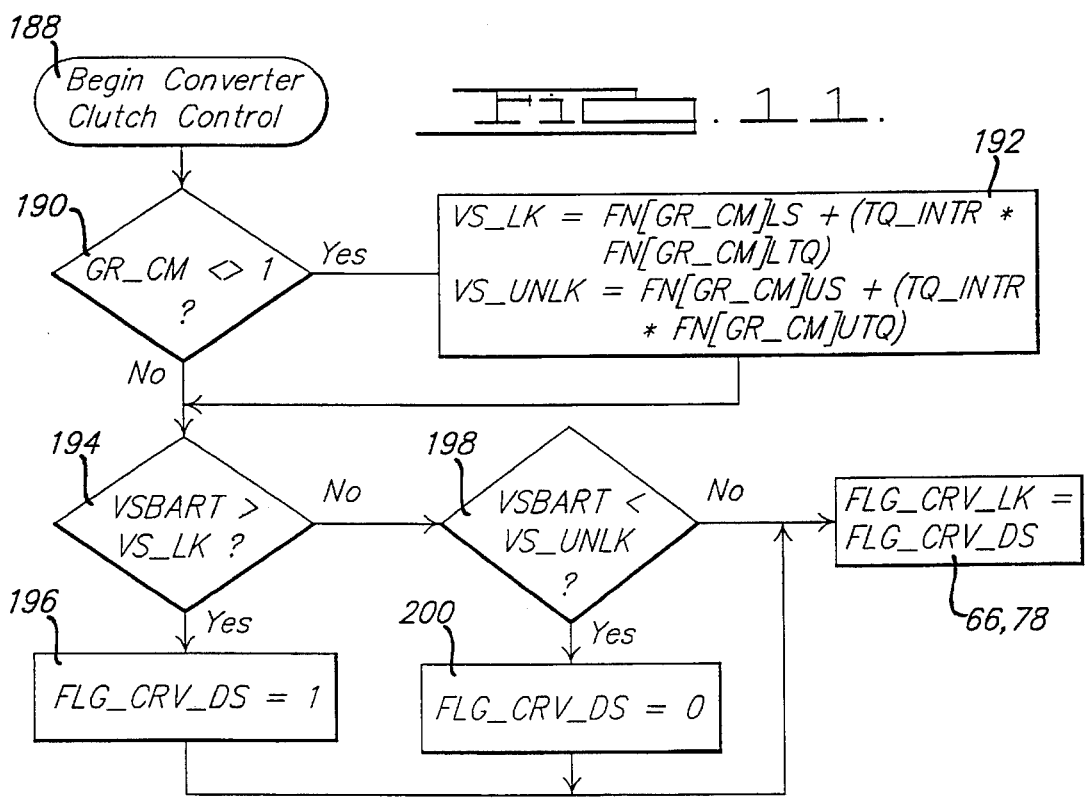
FIG. 11.

5,475,590

AUTOMATIC TRANSMISSION TORQUE CONVERTER BYPASS CLUTCH CONTROL USING ENGINE TORQUE COMPENSATION

BACKGROUND OF THE INVENTION

1. Related Application

This application is related to U.S. co-pending application 08/132,417 filed on Oct. 6, 1993 assigned by the assignee of this application.

2. Field of the Invention

This invention relates to control of a torque converter bypass clutch in an automatic transmission. More particularly, the invention pertains to altering where torque converter bypass clutch engagements and releases are to occur according to a reference schedule, on the basis of variations in engine output torque.

DESCRIPTION OF THE PRIOR ART

Conventionally, the electronic control system for an automatic transmission is provided with a gearshift schedule that defines conditions of current engine throttle position and vehicle speed at which each gear ratio change is to occur. Generally, data located in look-up tables stored in electronic memory, relating vehicle speed and engine throttle position for each of the gear ratio changes, are used to produce a signal representing the desired gear ratio. When the desired gear ratio is different from the current gear ratio, a command signal is produced by the control to cause a change in state of solenoid-operated shift valves. This changes the state of the planetary gear units and causes the gear ratio to change.

A reference schedule of gearshift boundaries is continually referenced during execution of control algorithms and used to produce an upshift signal and a downshift signal when a boundary of the gearshift schedule is crossed. Gearshifts are made by continually probing computing memory with current values of throttle position and vehicle speed, and determining, on the basis of the stored shift schedules, whether an upshift or downshift is required. Upshift points are determined also on the basis of maximum engine speed when a wide-open throttle condition is detected.

U.S. Pat. No. 4,943,921 describes an electronic control for scheduling gearshifts in an automatic transmission on the basis of variations in ambient barometric pressure. Various functions relating vehicle speed and throttle position determine the occurrence of each upshift and downshift by probing computer memory, in which the gearshift functions reside, with current values of the throttle position and vehicle speed. A reference gearshift schedule is corrected for the difference between the operating barometric pressure and a reference barometric pressure, at which the gearshift schedules are calibrated, to automatically compensate for the effect of barometric pressure variations on the gearshift schedule.

SUMMARY OF THE INVENTION

The method and system, according to this invention, for controlling the bypass clutch of an automatic transmission, essentially alters the vehicle speed at which the torque converter bypass clutch locks/unlocks are to occur. The control compensates for changes in engine output torque from the engine torque at which a reference torque converter lock/unlock schedule is defined.

The technique of the invention involves developing bypass clutch schedule at which acceptable gear ratio changes are to occur, the schedule being developed at reference magnitudes of engine output torque BTR BASE. The function for determining the magnitude of BTR BASE with reference to the current engine speed and throttle is stored in electronic memory accessible to a microprocessor. Current engine output torque TQ NET is calculated continually as is the ratio TQ NORM defined as TQ NET/BTR BASE. A vehicle equipped with an internal combustion engine controlled by a throttle and an automatic transmission is calibrated to determine a torque interpolation factor TQ INTR, engine speed adjustment and vehicle speed adjustment values that are combined arithmetically to modify the vehicle speed of the reference bypass clutch schedule. The torque interpolation factor, defined as a function with reference to the range of engine throttle position, is accessible continually for use in producing control outputs. Also stored in electronic memory are vehicle speed adjustment values stored on the basis of engine throttle and the relevant gear ratio to which upshifts and downshifts are made. A term comprising the product of the torque interpolation factor multiplied by the vehicle speed adjustment is added algebraically to the corresponding vehicle speed defined by the reference bypass clutch schedule. The resulting vehicle speed compensates for a change of engine output torque from the torque at which the reference schedule is defined so that a desirable upshift or downshift occurs under current conditions.

When the speed adjustment is multiplied by the current torque interpolation factor and that product is added to a vehicle speed from the reference schedule, which that defines when the bypass clutch is locked and unlocked, the result is a vehicle speed at which a desirable gearshift change occurs by compensating for engine output torque variations from the engine torque present when the reference bypass clutch lock/unlock schedule is defined.

BRIEF DESCRIPTION OF THE DRAWINGS

FIG. 8A and 8B are diagrams of logic for controlling gear ratio shifting of an automatic transmission.

FIG. 9 is a table showing representative values of vehicle speed adjustment for upshifts and downshifts over a range of throttle positions.

FIG. 10 is a table showing representative values at wide-open throttle of engine speed adjustment for engine output torque.

FIG. 11 is a diagram of logic for controlling torque converter bypass clutch operation.

FIG. 12 is a graph of a function relating throttle position and vehicle speed adjustment of converter bypass clutch lockup for a particular gear ratio.

DESCRIPTION OF THE PREFERRED EMBODIMENT

Figure 1:
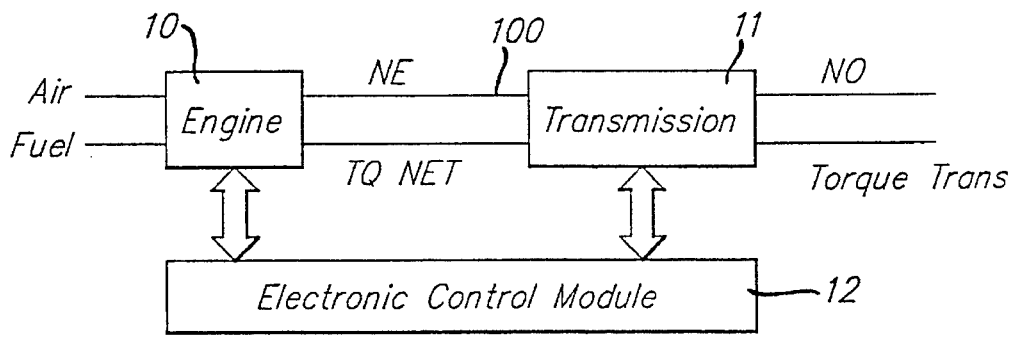
FIG. 1 is a block diagram showing the relationship of an internal combustion engine, transmission, and electronic control module used.

Referring to FIG. 1, air and fuel are inducted by an internal combustion engine 10, which drives a shaft connecting the engine output and transmission input having the speed of the engine, NE, and the engine brake torque TQ-NET. Both the engine and transmission 11 are coupled to an electronic engine control module, which includes a microprocessor, input conditioning circuit, an electronic memory containing various algorithms for processing spark timing input, exhaust gas recirculation rate input, percent methnol fuel input, air/fuel ratio input, engine RPM input, engine air charge input, engine coolant temperature, firing cylinder indication input, engine operating hours, power steering pressure, timer input, air conditioning head pressure or air change temperature input, and a flag indicating whether the air conditioning compressor is on or off. These engine operating parameters and other such parameters are described in U.S. Ser. No. 07/786,229, filed Oct. 31, 1991, which is owned by the assignee of the present invention. A method for determining engine brake torque TQ NET is described in U.S. Ser. No. 07/786,229, the entire disclosure of which is incorporated herein by reference. The magnitude of engine brake torque is stored in computer memory as the variable TQ NET and engine speed as NE.

Figure 2:
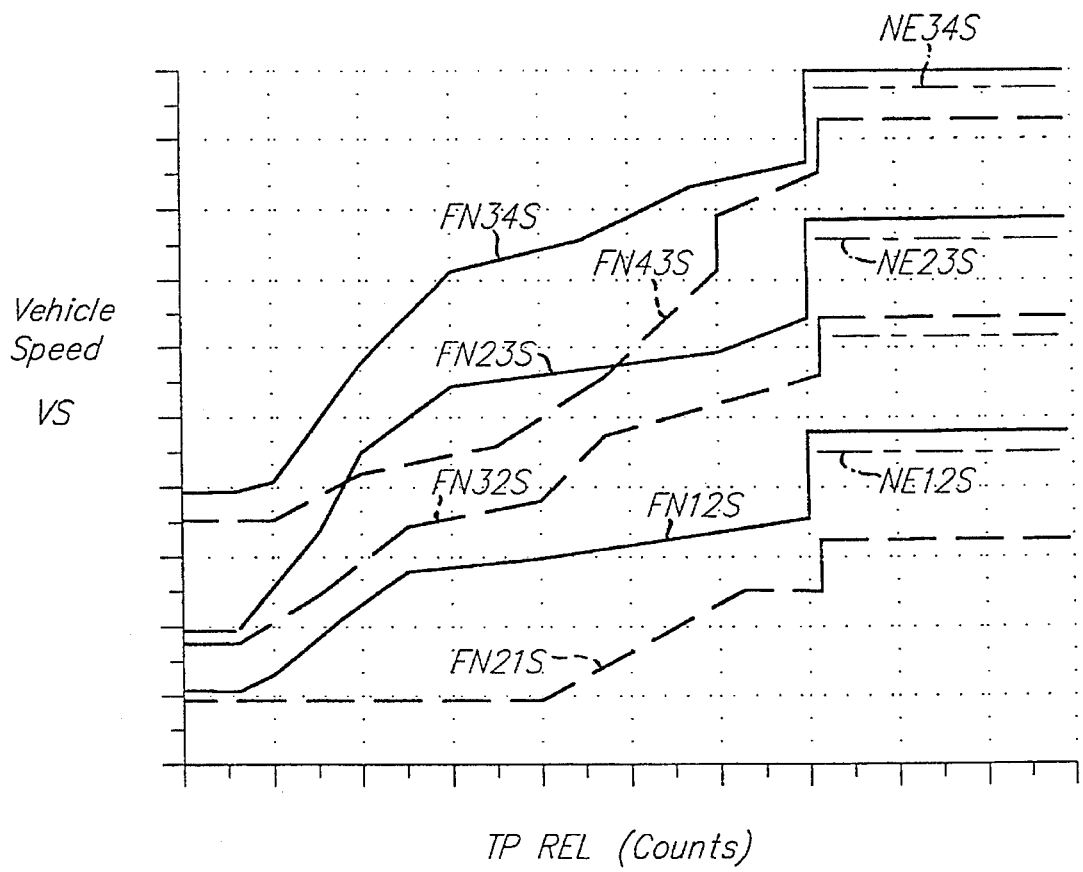
FIG. 2 is a graph showing a reference schedule of upshifts and downshifts for a four-speed automatic transmission.

FIG. 2 shows gear ratio boundaries defined in terms of vehicle speed VS and throttle position TP REL. Throttle position corresponds to a signal produced by a throttle position sensor PRNDE indicating the amount of engine throttle displacement from a closed throttle or idle setting. FIG. 2 shows where gear ratio changes, both upshifts and downshifts, are scheduled to occur automatically among the forward gear ratios produced by the transmission. Large values of TP REL occur near wide open throttle WOT, smaller values of TP REL indicate part throttle PT, and values near zero occur at nearly closed throttle positions CT. The data of FIG. 2 are stored in read-only-memory ROM in the form of a look-up table. The lines marked FNXXS define boundaries where upshifts and downshifts occur according to the reference schedule of FIG. 2, where XX represents the gear ratio change. At the right-hand end of the throttle position range near WOT, upshifts occur when engine speed has the values NEXXS.

A signal indicating each commanded gear ratio GR CM is produced, according to the schedule of FIG. 2, by a microprocessor using TP and VS as input. That signal causes a change in the state of solenoid-operated valves and a change of gear ratio to the commanded gear ratio. As VS and TP REL change during vehicle operation in a particular gear ratio such that a line of FIG. 2 is crossed during a background pass, during which engine and transmission control algorithms are executed, from an operating condition defined by these variables during the previous background pass, need for a gearshift is indicated by changing GM CM following a comparison of the desired gear ratio from FIG. 2 and the current gear ratio. For example, if the current operating condition passes from below the FN12S line to above that line, a gearshift from first gear to second gear is commanded because of the inequality between the current gear ratio (first gear) and the desired gear ratio from the schedule (second gear), provided other criteria considered by the control so permit. Similarly, downshifts may be commanded when the current operating condition passes through a downshift line, the dash lines of FIG. 2. When the operating condition during the current background pass is located in the zone between adjacent upshift and downshift lines, no gearshift is commanded.

Gearshifts are made also on the basis of engine speed corresponding to a WOT condition above which an upshift is commanded regardless of the TP value. As FIG. 2 indicates, a 1–2 upshift occurs at engine speed NE12S, provided TP is equal to or greater than a predetermined wide open throttle TP. Each of the other upshift lines, 2–3 and 3–4, has a corresponding WOT shift point NE23S and NE34S. The WOT shift points are executed before shift points defined by the VS-TP relationship, as discussed below.

Calibration constants are stored in ROM, accessible to the microprocessor, solely by reference to their memory addresses. Data stored in ROM or other electronic memory in the form of values of a first variable X, each X value having a single corresponding value of the second variable Y, recalled from memory by reference to a memory location and the first variable, are f(x) or "fox" functions. Data stored in ROM or other electronic memory in the form of multiple first variables X and Y, each combination thereof having a corresponding third variable Z, whose value is recalled from memory by reference to a memory location and variables X and Y, called "tables". Data recalled from tables and fox functions are automatically interpolated to correspond to the values of the variables used to recall the data. A "register" is a variable whose value is calculated through execution of control algorithms.

Figure 3A:
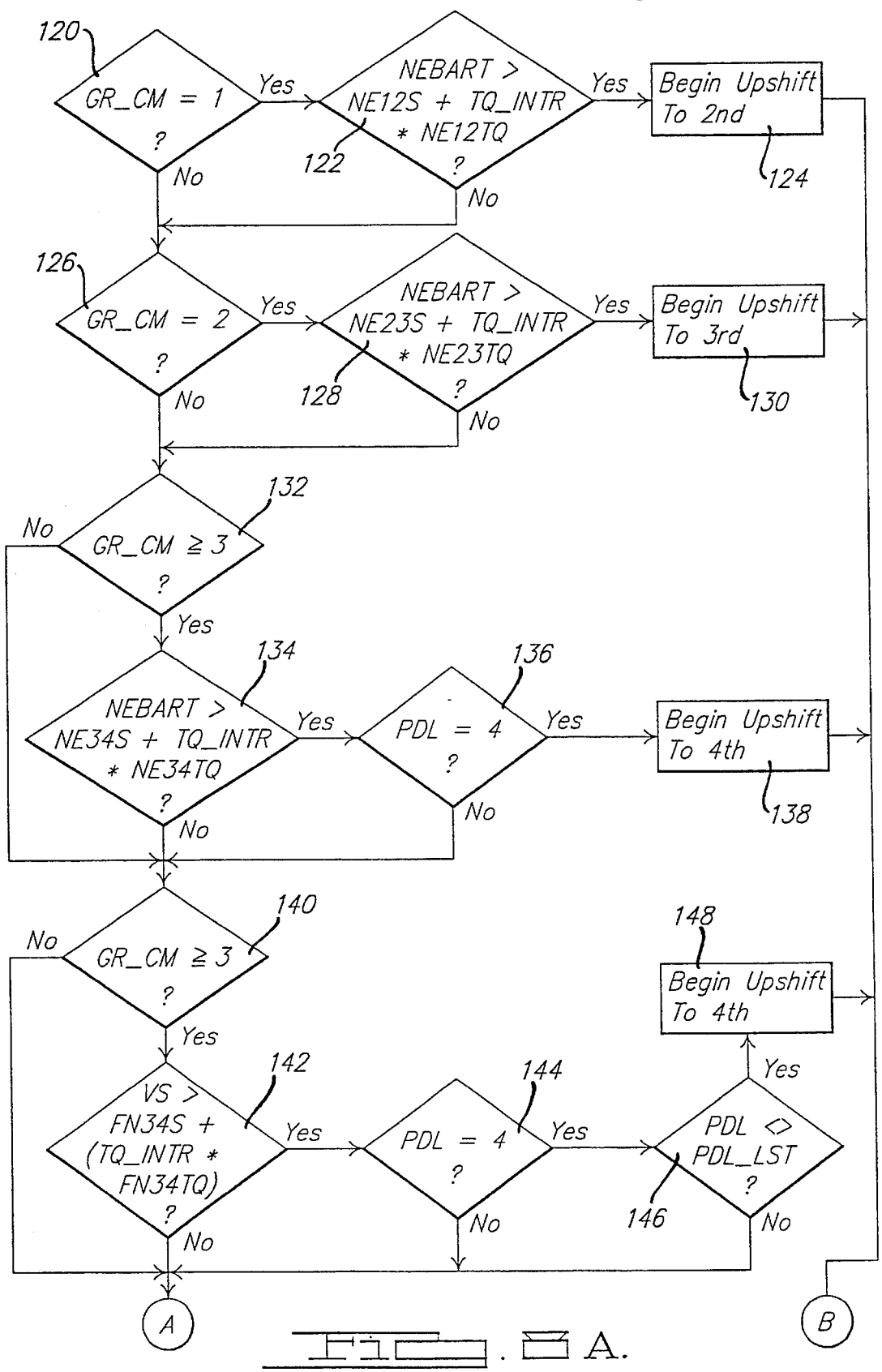
FIG. 3 is a schematic diagram of a microprocessor, an electronic memory, various input signals produced by sensors representing the current state of various operating parameters, and output signals used to control the components of an automatic transmission.
Figure 5B:
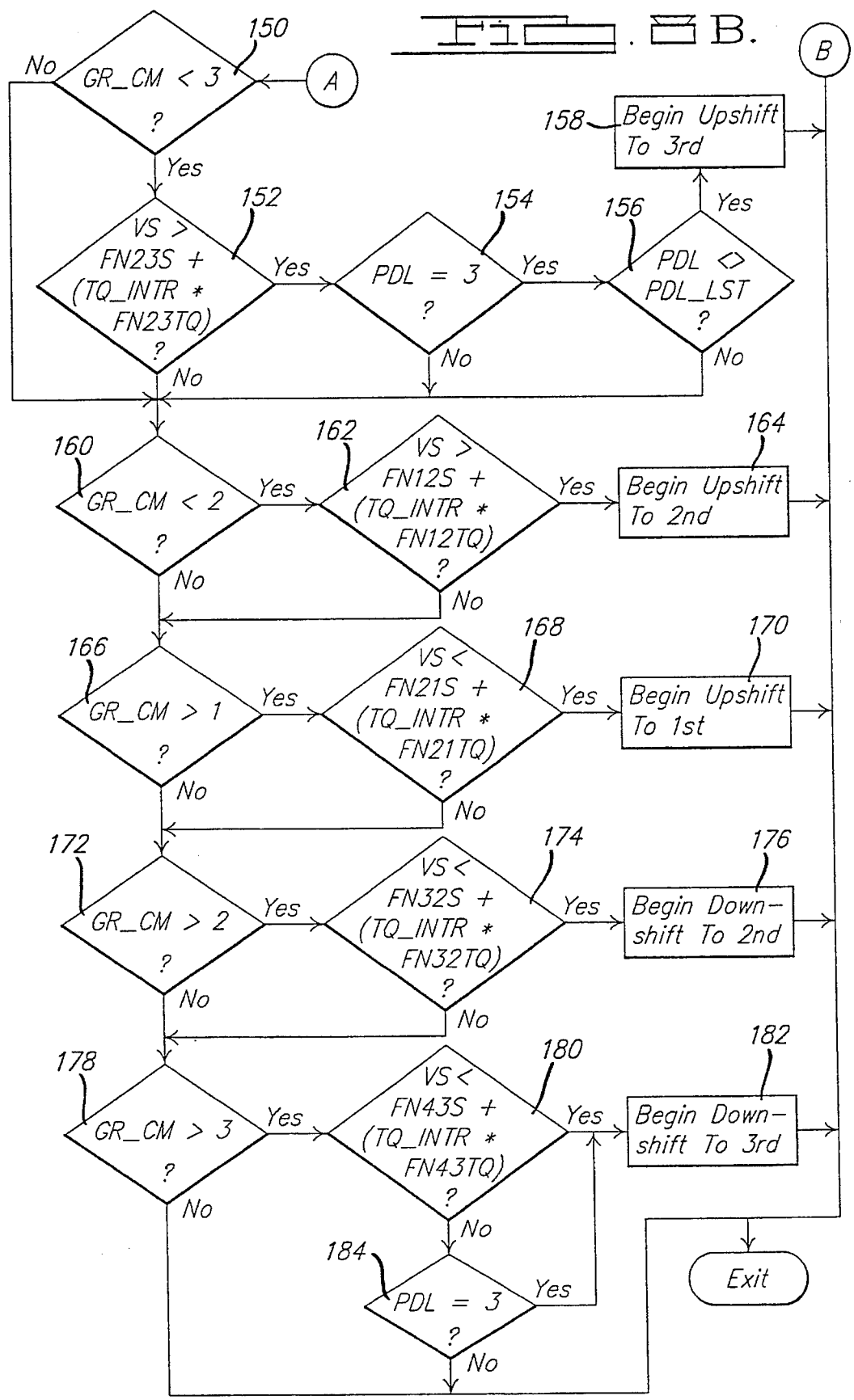

The microprocessor 50 shown in FIG. 3 is an integrated, central processor supplied with signals representing engine throttle position, engine speed, engine coolant temperature, torque converter speed, vehicle speed, a selected range of a gear selector, throttle valve pressure, the state of the selected transmission operating modes 52, the state of a brake switch 54, other input information mentioned above with reference to U.S. Ser. No. 07/786,229, and signals representing the state of other operating parameters. Information conveyed by these input signals is conditioned by input conditioning circuitry 56 and transmitted on data bus 58 to a central processing unit 60 accessible to electronic memory 62. The electronic memory contains control algorithms for use in controlling gear shift scheduling, electronic pressure control EPC, and torque converter bypass clutch 82 operation. The central processing unit recalls information and control algorithms from electronic memory 62, executes the algorithms, and produces output signals carried on data bus 64 to output driver circuits 66, which produce electronic signals from the signals produced by the microprocessor. The output signals drive electrical solenoid-operated valves 70, 72, 74, 76, 78 located in an hydraulic valve body 68 adapted to respond to the output signals.

The results of logical and arithmatic computations executed by the processor are stored in RAM, which is addressed, erased, rewritten, or changed in accordance with logic of the control algorithms.

Data that are stored in memory include shift schedule information look-up tables, in which two variables, such as throttle position and vehicle speed, are mutually related and stored by reference to a particular gear ratio. Data stored in memory also includes functions, in which a first variable is used to select from memory corresponding variables and constants.

The algorithms that control operation of the transmission are divided into several control modules executed sequentially in a known fashion during a background pass. The algorithms of each module are executed sequentially just as the modules themselves are executed sequentially. Information that results from the sensor input data and information stored in memory and learned from previous executions of background passes is used during execution of the control algorithms to produce electronic signals present at the output ports of the processor.

Output signals drive on/off solenoid-operated shift valves 70, 72, 74, a variable force EPC solenoid 76, and a torque converter bypass clutch solenoid 78. Friction elements, such as clutches 80, 82, brakes, and servos, are pressurized and vented through operation of solenoid-operated shift valves 70, 72, 74. The state of solenoids 70, 72, 74 change when a gear ratio change is commanded as a result of executing control algorithms, and the friction elements are engaged and released in accordance with the state of those solenoids.

Figure 4:
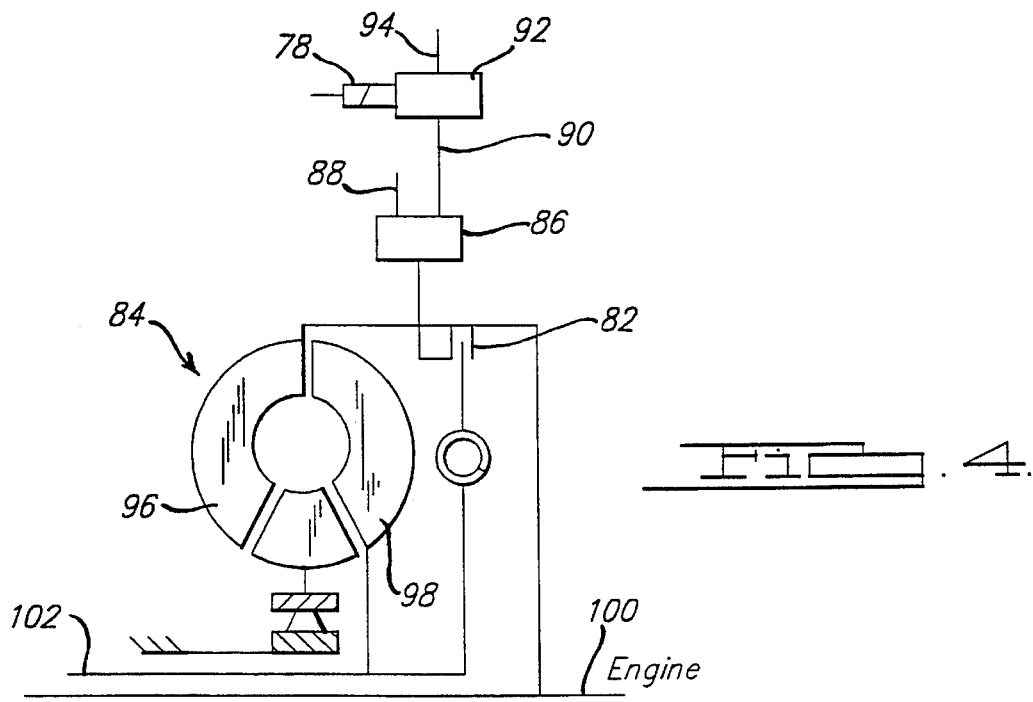
FIG. 4 shows a torque converter, bypass clutch, solenoid, and hydraulic valves for controlling the bypass clutch.

Referring now to FIG. 4, the lock-up clutch 82 of a torque converter 84 is alternately hard-locked or soft-locked (modulated) by directing hydraulic fluid through converter bypass-clutch control valve 86, which is supplied with regulated line pressure in line 88. A variable pressure valve 92 is supplied with constant pressure through line 94 from a solenoid-pressure regulator valve and is controlled by a pulse-width-modulated (PWM) signal applied to solenoid 78 from the microprocessor output. Valve 86 produces a pressure difference across bypass clutch 82. When clutch 82 is hard-locked, a direct mechanical connection between impeller 96 and turbine 98 is produced. The impeller of torque converter 84 is driven from the crankshaft 100 of an engine, and turbine 98 drives a transmission input shaft 102. When clutch 82 is disengaged, the turbine is driven hydrodynamically by the impeller.

Figure 5:
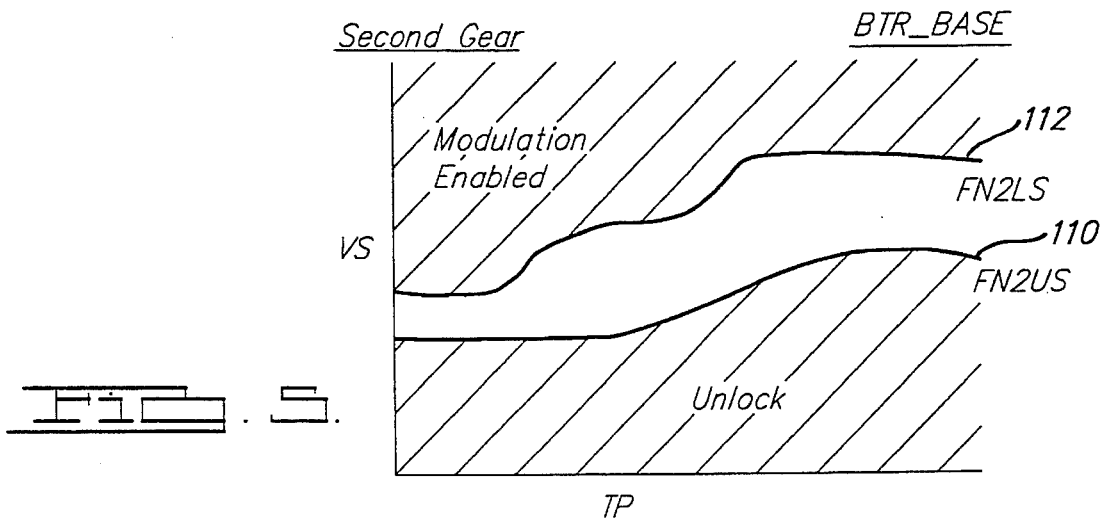
FIG. 5 is a graph showing a schedule that defines, in terms of vehicle speed and throttle position, the state of engagement and disengagement of a torque converter bypass clutch.

FIG. 5 represents data from a look-up table stored in electronic memory relating vehicle speed and engine throttle position, each such table corresponding to a particular gear ratio. Line 110 represents the upper range of vehicle speed below which the torque converter 84 is unlocked by unlocking lockup clutch 82. For second gear ratio, line 110 carries the symbol FN2US. Line 112 defines the lower limit of vehicle speed over the range of engine throttle position, above which bypass clutch 82 is modulated or locked while the transmission is operating in the normal mode. For the second gear ratio, line 112 is represented symbolically by FN2LS.

When the vehicle is operating in the range between curves 110 and 112, there is no change of the state of the bypass clutch 82. This range represents a hysteresis zone in which the current state of bypass clutch 82 is maintained.

Also stored in electronic memory is a table of expected engine torque output corresponding to the current engine speed NE and throttle position TP REL. This table is identified as BTR BASE in FIG. 7. The table is populated with engine torque values BTR BASE at which the reference shift schedule of FIG. 2 is established. The nominal conditions, such as a 20° spark angle, and the engine torque output corresponding to those conditions, are the conditions and torque values at which the reference gear shift schedule, the schedule of FIG. 2, is established.

The variable normalized torque output of the engine TQ NORM is defined as the ratio of TQ NET/BTR BASE. This normalized torque is the basis for changes to the standard shift schedule of FIG. 2 that are made to compensate for variations in the expected torque output of the engine.

Figures 6, 7:
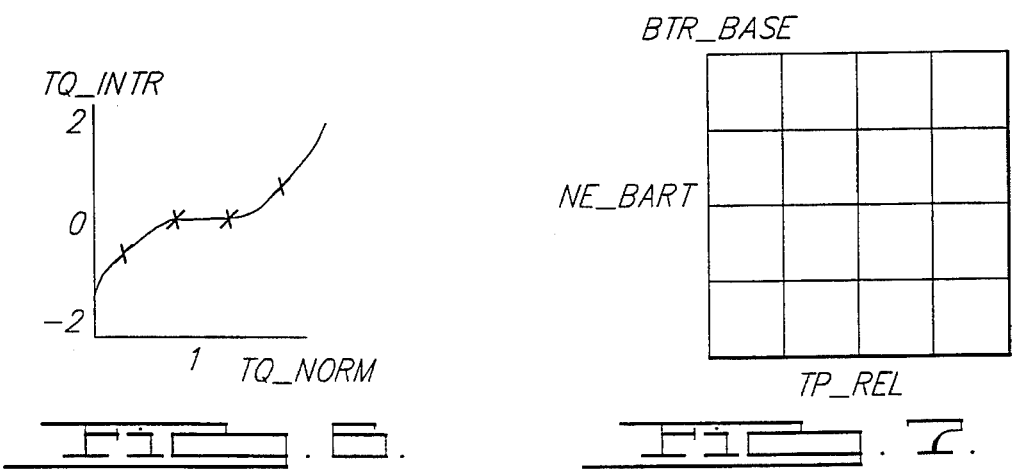
FIG. 6 is a graph showing the relation of torque interpolation factor and normalized engine output torque.
FIG. 7 is a table representing electronically stored value of expected torque output produced by an internal combustion engine when operating at current engine speed and throttle position.

The function shown in FIG. 6, relating TQ INTR and TQ NORM, is also stored in electronic memory in the form of a look-up table. The value of TQ INTR is substantially zero, in a range of TQ NORM that straddles the value 1.0, rises above zero as TQ NORM increase above 1.0, and declines below zero when TQ NORM falls below the mid-range of TQ NORM values. The function relating TQ INTR and TQ NORM is determined by calibrating a vehicle equipped with an engine and automatic transmission such that desirable gear ratio changes are produced by altering the gear shift schedule of FIG. 2 to compensate for changes in engine output torque. For example, TQ INTR may equal 0.0 in the mid-range of TQ NORM values, i.e., in a narrow band on either side of 1.0. The function of FIG. 6 is determined with the value of vehicle speed adjustment, engine speed adjustment, and converter bypass clutch vehicle speed adjustment, discussed below with reference to FIGS. 9, 10, and 12.

The control logic for scheduling gear ratio changes by controlling the states of shift solenoids 70, 72, 74 is described next with reference to FIG. 8. The value of TQ NET is determined according to the method described in U.S. Ser. No. 786,229, filed Oct. 13, 1991, now U.S. Pat. No. 5,029,087. To determine the torque interpolation factor TQ INTR, BTR BASE is determined from the look-up table (FIG. 7) entered with engine speed NE and throttle position TP REL. If the base torque value from this table is zero, TQ NORM is set equal to 1.0; otherwise, TQ NORM is equal to TQ NET/BTR BASE. In either case, TQ INTR is equal to the value determined from the function of FIG. 6 when the table is referenced with values of TQ NORM.

Turning now to FIG. 8, the control algorithms for producing upshifts and downshifts in accordance with the present invention, by producing changes in the states of the solenoid-actuated shift valves 70, 72, 74, execute logic in the following order: first, a check is made to determine whether an upshift on the basis of engine speed is required; second, a check is made to determine whether an upshift based on vehicle speed is required; and third, a check is made to determine whether a downshift based on vehicle speed is required.

At statement 120, the current commanded gear GR CM is compared to 1.0 in order to determine whether the first speed ratio is the desired speed ratio. If statement 120 is true, statement 122 is executed to determine whether filtered engine speed NE BART is greater than [NE12S+TQ INTR*NE12TQ], the sum of the engine speed of which an upshift from first gear to second gear would occur according to the reference gear shift schedule of FIG. 2 and TQ INTR*NE12TQ. The constant NE12TQ is the engine speed adjustment value that compensates for engine output torque loss due to operation of the vehicle at conditions that differ from the conditions at which the reference gearshift schedule is determined. Engine speed is passed through a low pass filter implemented in software to reject high frequency speeds signals or noise.

If statement 122 is true, at statement 124, the state of the solenoid-operated shift valves is changed to the combination of states required to produce the second forward speed ratio. The term TQ INTR*NE12TQ corrects, compensates, or adjusts for variations in engine output torque from the torque at which the schedule of FIG. 2 is determined. The term NE12TQ is a calibrated differential engine speed, for example, −300 rpm, such that when it is multiplied by TQ INTR and added to the engine speed of the reference shift schedule, the sum is lower than the reference schedule engine speed. Therefore, the shift occurs at a lower engine speed and compensates for a change of engine torque from the engine torque at which the reference shift schedule is established. This action produces a more desirable gear ratio change than would the reference schedule at the lower engine output torque. If, for example, NE12S is 4000 rpm, TQ INTR is 1.0, and NE12TQ is −300 rpm, an upshift from first gear to second gear occurs at 3700 rpm instead of 4000 rpm. This reduction in engine speed accounts for a reduction in engine torque output due to a change in one of the engine operating parameters such as a change in the spark angle or air/fuel ratio at which the reference gear shift schedule is established. The values of TQ INTR and NE12TQ are determined by calibration, e.g., by operating the vehicle at a much higher elevation above sea level than the altitude at which the reference gear shift schedule was established, to determine the combination that will produce acceptable upshifts.

If statement 122 is false, control passes to statement 126 where an inquiry, similar to that of statement 120, is made to determine whether the commanded gear is currently the second gear. If so, a check is made at statement 128 to determine whether engine speed exceeds $$NE23S+[TQ\ INTR*NE23TQ]$$

where NE23S is the engine speed at which an upshift from the second gear ratio to the third gear ratio is scheduled to occur according to the reference shift schedule of FIG. 2, and NE23TQ is a calibrated differential engine speed such that when it is multiplied by TQ INTR, the product of those terms corrects NE23S such that an acceptable upshift is made from the second gear to the third gear ratio. If statement 128 is true, control passes to 130 where the state of the shift valves is changed to the conditions at which the third gear ratio is produced.

If statement 128 is false, control passes to 132 to determine whether the current commanded gear is equal to or less than the third gear ratio. If so, a check is made at 134, similar to those of statements 122 and 128, to determine whether engine speed is sufficiently high to produce an acceptable upshift to the fourth gear ratio by compensating for engine torque variations from the conditions at which the standard gear shift schedule is established. If 134 is true, at 136, the state of the gear shift lever, represented by the PRNDL signal, is checked to determine whether it is equal to 4, the position that would permit the fourth gear ratio to be produced. If so, at 138, the state of the solenoid actuated shift valves is changed to the combination of states that produce the fourth gear ratio.

If any of statements 132, 134, or 136 is false, control passes to 140 in order to determine whether the commanded gear ratio is lower than the fourth speed ratio. If 140 is true, at 142, a check is made to see if vehicle speed VS is greater than FN34S+[TQ INTR*FN34TQ]. FN34S is the vehicle speed from FIG. 2 where upshifts from the third speed ratio to the fourth speed ratio are scheduled to occur, and FN34TQ is a calibrated differential vehicle speed such that when it is multiplied by TQ INTR, the product of those terms corrects FN34S such that an acceptable upshift is made from the third gear to the fourth gear ratio.

If 142 is true, at 144, the current state of the gear shift lever is compared to the fourth position. If statement 144 is true, control passes to 146 to determine whether the current PRNDL position has been changed from the PRNDL position recorded during the last executed background pass. If so, the state of the solenoid-operated shift valves is changed at 148 to produce an upshift of the fourth speed ratio.

If any of the statements 142, 144, or 146 is false, control passes to 150 where it is determined whether the current commanded gear is less than the third gear ratio. If so, at 152, vehicle speed is compared to $$FN23S+(TQ\ INTR*FN23TQ)$$

where FN23S is the vehicle speed at which a 2–3 upshift is scheduled to occur according to the schedule of FIG. 2, and FN23TQ is the vehicle speed adjustment for a 2–3 upshift accounting for engine output torque loss. If 152 is true, at 154, the position of the PRNDL indicator is compared to 3. If 154 is equal to the third position, at 156, a check is made to see if the PRNDL position has changed from the last executed background pass. If both 154 and 156 are true, the state of the shift valves is changed at 158 to produce an upshift from the second gear ratio to the third gear ratio.

If either of the statements 150, 152, or 156 is false, control passes to 160 to determine if the current commanded gear ratio is less than 2. If that statement is true, at 162, a check is made to see if vehicle speed is greater than $$FN12S+(TQ\ INTR*FN12TQ)$$

where FN12S is the vehicle speed at which a 1–2 upshift occurs according to the schedule of FIG. 2, and FN12TQ is the vehicle speed adjustment for a 1–2 upshift compensating for engine output torque loss. If the current vehicle speed exceeds the calculated value, at 164, the state of the shift valves is changed to produce the second gear ratio.

If statement 160 or 162 is false, control passes to 166 to determine whether the current commanded gear is greater than the first gear ratio. If so, at 168, a check is made to determine whether vehicle speed is less than the vehicle speed at which a 2–1 downshift would occur according to the schedule of FIG. 2 when compensated for torque reduction according to the equations discussed above. If statement 168 is true, at 170, the state of the shift valves is changed to produce a 2–1 downshift.

Similarly, in statements 172, 174, and 176, a 3–2 downshift is produced by altering the state of the shift valves if the current vehicle speed is less than the engine torque compensated vehicle speed.

If the commanded gear is greater than the third speed ratio, and the vehicle speed is less than the engine torque output compensated vehicle speed at which a 4–3 downshift is to occur, then at statement 182 the state of the shift valves is changed to produce the 3–4 speed ratio. If statement 180 is false, and the PRNDL position is equal to three, then a 3–4 downshift is initiated. Otherwise, if either of statements 178 or 184 is false, control exits the gear shift control algorithm at 186.

FIGS. 9 and 10 show representatives of values of FNXXTQ and NEXXTQ, respectively, wherein "XX" represent 1–2, 2–3, and 3–4 upshifts, or 4–3, 3–2, or 2–1 downshifts.

FIG. 11 shows, schematically, the control logic that schedules locking and unlocking, i.e., application and release, of the torque converter bypass clutch 82 according to the present invention. The converter clutch control algorithm is entered at 188, and at 190 a check is made to determine whether the commanded gear is other than the first gear. If statement 190 is true, the vehicle speed at which the torque converter is locked VS LK and the vehicle speed at which the torque converter clutch is unlocked VS UNLK, are calculated at 192 thus

VS LK=FN[GR CM]LS+TQ INTR*FN[GR CM]LTQ

VS UNLK=FN[GR CM]US+TK−INTR*FN[GR CM]UTQ wherein FN[GR CM]LS is the vehicle speed corresponding to the current commanded gear at which the torque converter bypass clutch is locked according to the reference schedule of FIG. 5; TQ INTR is the torque interpolation factor of FIG. 6; and FN[GR CM]LTQ is the vehicle speed corresponding to the locked condition of the torque converter bypass clutch, determined by calibration and compensating for engine output torque reduction such that when it is multiplied by TQ INTR, and that product is added to the vehicle speed obtained from the schedule of FIG. 4, an acceptable gear shift results. FIG. 12 shows a function relating the variable FNXLTQ over the range of throttle position, which is stored in electronic memory, wherein X is a reference to the commanded gear ratio and L to the locked condition of clutch 82. A similar schedule of values for FNXUTQ is also stored in electronic memory and recalled as required from memory on the basis of the current operating throttle position.

Statement 192 also calculates vehicle speed at which the torque converter bypass clutch 82 is unlocked

VS UNLK=FN[GR CM]US+TQ INTR*FN[GR CM]UTQ wherein FN[GR CM]US is the vehicle speed value from the reference schedule of FIG. 5 where a torque converter bypass clutch is scheduled to unlock; TQ INTR is the torque interpolation factor; and FN[GR CM]UTQ is the vehicle speed corresponding to the commanded gear ratio established by calibration that compensates for engine output torque reduction such that, when it is multiplied by INTR and that product is added to vehicle speed from the reference schedule of FIG. 5, an acceptable gear shift results.

At statement 194, VSBART is compared to VS LK to determine whether current vehicle speed is greater than the torque compensated vehicle speed at which the torque converter clutch is to lock. If 194 is true, at 196, FLG CRV DS is set, thereby indicating the torque converter bypass clutch is to be locked. Control then passes to statement 202 where FLG CRV LK is set equal to 1.0 closing the output and driver circuit 66 to energize the converter bypass clutch solenoid 78 such that bypass clutch 82 is locked.

If statement 194 is false, at 200, FLG CRV DS is set equal to zero, and at 202, FLG CRV LK is also set equal to zero. This alternative resetting of FLG CRV LK goes to the output driver circuit 66 to apply a signal to bypass clutch solenoid 78 so that bypass clutch 82 is unlocked.

Having described the preferred embodiment of our invention, what we claim and desire to secure by U.S. Letters Patent is:

1. A method for controlling operation of a torque converter bypass clutch for use in a multiple-gear ratio automatic transmission of a motor vehicle having an engine controlled by a throttle position, comprising the steps of:

determining a current engine output torque TQ NET;

developing a bypass clutch schedule at a reference engine output torque BTR BASE, said bypass clutch schedule defining conditions under which the bypass clutch is to be locked;

determining from said bypass clutch schedule a predetermined minimum bypass clutch lock vehicle speed FN LS above which the bypass clutch can lock;

determining a bypass clutch vehicle speed adjustment to compensate for a difference between the current engine output torque TQ NET and reference BTR BASE;

calculating and a bypass clutch lock engine torque compensation vehicle speed from said bypass clutch vehicle speed adjustment and said predetermined minimum bypass clutch lock vehicle speed;

determining a current vehicle speed;

comparing said current vehicle speed to the bypass clutch lock engine torque compensation vehicle speed; and locking the bypass clutch when said comparison indicates that said current vehicle speed exceeds said bypass clutch lock engine torque compensation vehicle speed.

2. The method of claim 1 wherein the step of developing a bypass clutch schedule comprises the steps of:

operating the engine at the reference engine output torque BTR BASE; and determining for a particular gear ratio over a range of current throttle positions a relation between a vehicle speed and the corresponding current throttle position at which the bypass clutch can be locked and an acceptable gear ratio change to said gear ratio will result.

3. The method of claim 1 wherein the step of determining the bypass clutch vehicle speed adjustment, comprises:

determining a current throttle position;

calculating a normalized engine torque output TQ NORM, as a function of the ratio of TQ NET/BTR BASE;

determining the engine torque interpolation factor corresponding to the normalized engine torque output TQ NORM;

establishing a function relating the engine torque interpolation factor TQ INTR and the normalized engine torque output TQ NORM;

determining the bypass clutch lock vehicle speed adjustment FN LTQ corresponding to a current throttle position; and calculating the bypass clutch lock engine torque compensation vehicle speed from the relation FN LS+TQ INTR * FN LTQ.

4. A method for controlling operation of a torque converter bypass clutch for use in a multiple-gear ratio automatic transmission of a motor vehicle having an engine controlled by a throttle position, comprising the steps of:

determining a current engine output torque TQ NET;

developing a bypass clutch schedule at a reference engine output torque BTR BASE, said bypass clutch schedule defining conditions under which the bypass clutch is to be unlocked;

determining from said bypass clutch schedule a predetermined maximum bypass clutch unlock vehicle speed FN US above which the bypass clutch can unlock;

determining a bypass clutch vehicle speed adjustment to compensate for a difference between the current engine output torque TQ NET and the reference BTR BASE;

calculating a bypass clutch unlock engine torque compensation vehicle speed from said bypass clutch vehicle speed adjustment and said predetermined maximum bypass clutch unlock vehicle speed;

determining a current vehicle speed;

comparing said current vehicle speed to the bypass clutch unlock engine torque compensation vehicle speed; and unlocking the bypass clutch when said comparison indicates that said current vehicle speed is less than said bypass clutch unlock engine torque compensation vehicle speed.

5. The method of claim 1 wherein the step of developing a bypass clutch schedule comprises the steps of:

operating the engine at the reference engine output torque BTR BASE; and determining for a particular gear ratio over a range of current throttle positions a relation between a vehicle speed and the corresponding current throttle position at which the bypass clutch can be unlocked and an acceptable gear ratio change to said gear ratio will result.

6. The method of claim 4 wherein the step of a bypass clutch unlock engine torque compensation vehicle speed comprises:

determining a current throttle position;

calculating a normalized engine torque output TQ NORM, as a function of the ratio of TQ NET/BTR BASE;

determining an engine torque interpolation factor corresponding to the normalized engine torque output TQ NORM;

establishing a function relating the engine torque interpolation factor TQ INTR and the normalized engine torque output TQ NORM;

determining a bypass clutch unlock vehicle speed adjustment FN UTQ corresponding to a current throttle position; and calculating the bypass clutch unlock engine torque compensation vehicle speed from the relation FN US+TQ INTR * FN UTQ.

7. A method for controlling, with the aid of a digital computer, operation of a torque converter bypass clutch of a multiple-gear ratio automatic transmission for use in a motor vehicle having an engine controlled by a throttle position, comprising the steps of:

providing said computer with a data base including at least:

a bypass clutch schedule at a reference engine output torque BTR BASE, wherein said schedule defining conditions under which the bypass clutch is to be locked and unlocked; a bypass clutch vehicle speed adjustment to compensate for a difference between a current engine output torque and the reference BTR BASE;

repetitively determining in the computer;

the current engine output torque TQ NET;

repetitively determining from the bypass clutch schedule a predetermined minimum bypass clutch lock vehicle speed FN LS above which the bypass clutch can lock and a maximum bypass clutch unlock vehicle speed FN US below which the bypass clutch can unlock;

repetitively determining the bypass clutch vehicle speed adjustment;

repetitively calculating in the computer a bypass clutch lock engine torque compensation vehicle speed from said bypass clutch vehicle speed adjustment and said predetermined minimum bypass clutch lock vehicle speed, and a bypass clutch unlock engine torque compensation vehicle speed from said bypass clutch vehicle speed adjustment and said predetermined maximum bypass clutch lock vehicle speed;

supply to the computer a current vehicle speed;

repetitively comparing in the computer the current vehicle speed to the bypass clutch lock engine torque compensation vehicle speed and the bypass clutch unlock engine torque compensation vehicle speed; and locking the bypass clutch when said comparison indicates that the current vehicle speed exceeds said bypass clutch lock engine torque compensation vehicle speed and unlocking the bypass clutch when said comparison indicates that the current vehicle speed is less than said bypass clutch unlock engine torque compensation vehicle speed.

8. A system for controlling operation of a torque converter bypass clutch for use in a multiple-gear ratio automatic transmission of a motor vehicle, comprising:

an engine having a variable position throttle for controlling the engine;

memory means containing a bypass clutch schedule developed at reference engine output torque BTR BASE, the schedule defining conditions under which the bypass clutch is to be locked and unlocked, and a schedule from which the current magnitude of engine output torque can be determined;

means for determining the current commanded gear ratio;

means for calculating current engine output torque TQ NET;

means for determining current vehicle speed;

means for determining bypass vehicle speed adjustment to account for a difference between the current engine output torque and reference BTR BASE;

means for determining from the bypass clutch schedule a predetermined bypass clutch lock vehicle speed FN LS above which the bypass clutch can lock;

means for calculating bypass clutch lock engine torque compensation vehicle speed from said bypass clutch vehicle speed adjustment and said predetermined bypass clutch lock vehicle speed;

means for comparing current vehicle speed to the bypass clutch lock engine torque compensated vehicle speed; and means for locking the bypass clutch when said comparison indicates current vehicle speed exceeds said bypass clutch lock engine torque compensated vehicle speed.

9. The system of claim 8 wherein the bypass clutch schedule of the memory means further defines conditions under which the bypass clutch is to be unlocked, and the system further comprises:

means for determining from the bypass clutch schedule a predetermined bypass clutch unlock vehicle speed FN US below which the bypass clutch can unlock;

means for calculating bypass clutch unlock engine torque compensation vehicle speed from said bypass clutch vehicle speed adjustment and said predetermined bypass clutch unlock vehicle speed;

means for comparing current vehicle speed to the bypass clutch unlock engine torque compensated vehicle speed; and means for unlocking the bypass clutch when said comparison indicates current vehicle speed is less than said bypass clutch unlock engine torque compensated vehicle speed.

* * * * *